United States Patent [19]

Brems

[11] Patent Number: 4,498,572
[45] Date of Patent: Feb. 12, 1985

[54] WORKPIECE CLAMPING MECHANISM FOR MULTIPLE STATION TRANSFER MACHINES

[76] Inventor: John H. Brems, Apt. 16-D, 2800 S. Ocean Blvd., Boca Raton, Fla. 33432

[21] Appl. No.: 327,517

[22] Filed: Dec. 4, 1981

[51] Int. Cl.³ ............................................. B65G 47/00
[52] U.S. Cl. .................................... 198/345; 29/1 A; 29/33 P
[58] Field of Search ................ 198/345; 29/1 A, 33 P

[56] References Cited

U.S. PATENT DOCUMENTS

| | | | |
|---|---|---|---|
| 3,213,996 | 10/1965 | Tech | 198/345 |
| 3,308,921 | 3/1967 | Bower | 198/345 |
| 3,968,869 | 7/1976 | Stalker | 198/345 |
| 4,201,284 | 5/1980 | Brems | 198/345 |
| 4,253,559 | 3/1981 | Myers et al. | 198/345 |
| 4,362,233 | 12/1982 | Brems | 198/345 |

Primary Examiner—Robert J. Spar
Assistant Examiner—Jonathan D. Holmes
Attorney, Agent, or Firm—Barnes, Kisselle, Raisch, Choate, Whittemore & Hulbert

[57] ABSTRACT

A multiple station transfer machine in which workpieces are progressively transferred from station to station requires that the workpieces be individually clamped at each station by a movable clamp. The present device includes a unified mechanism at each station for clamping the workpieces at individual stations by a common linearly movable actuator which can function simultaneously at each station. The clamping mechanism is arranged to adapt to various clamping positions at individual stations independently of the stroke of the common actuator. This is accomplished by a roller mounted, two-stage cam operating on a clamping member and driven by a preloaded spring in response to the linearly movable actuator. The unified mechanisms can be placed in various positions of orientation while being actuated by the same linear actuator.

1 Claim, 15 Drawing Figures

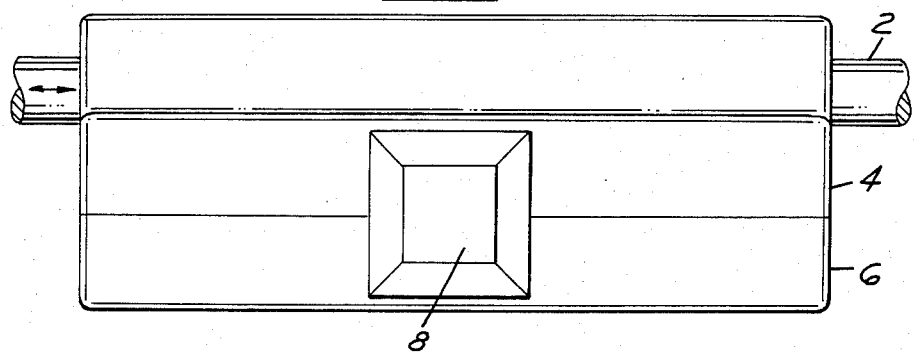
FIG.1
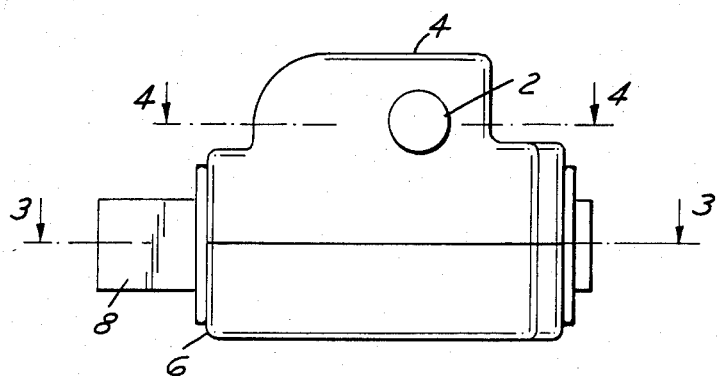
FIG.2
FIG.3
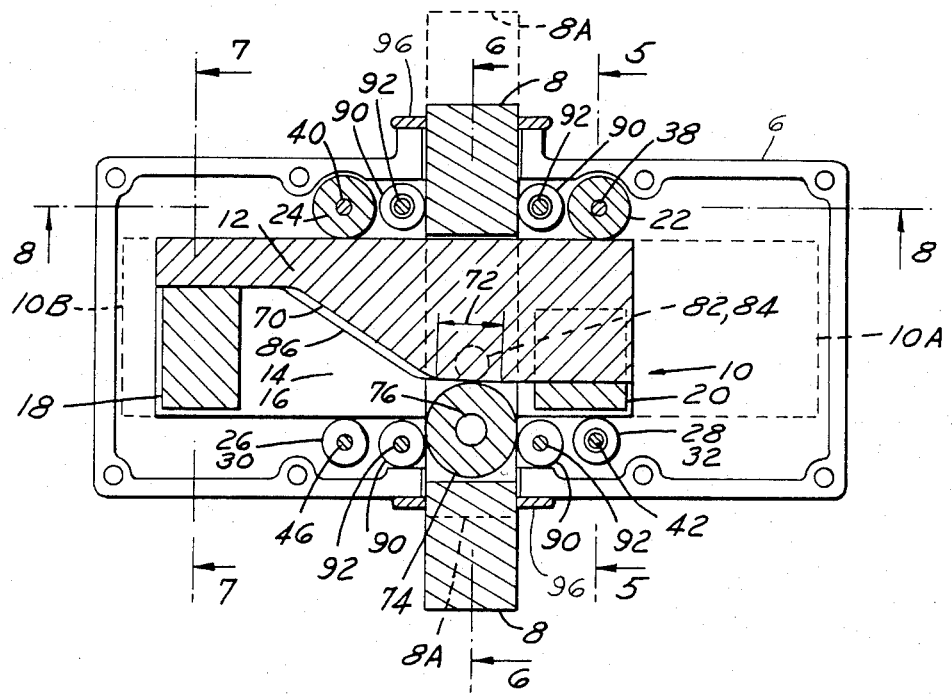

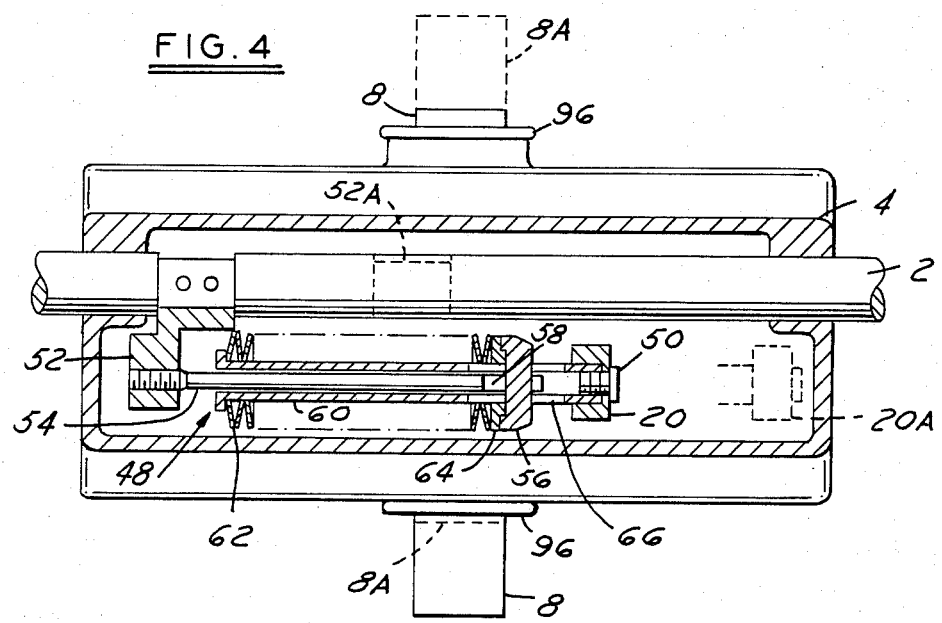
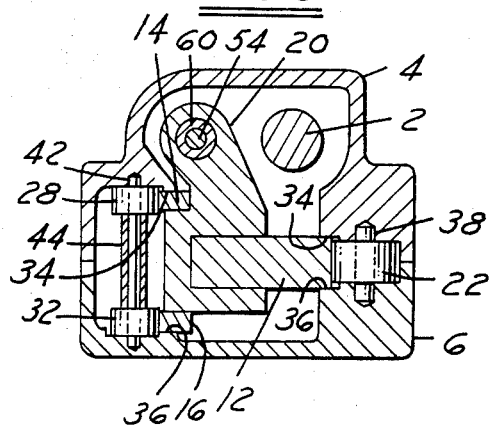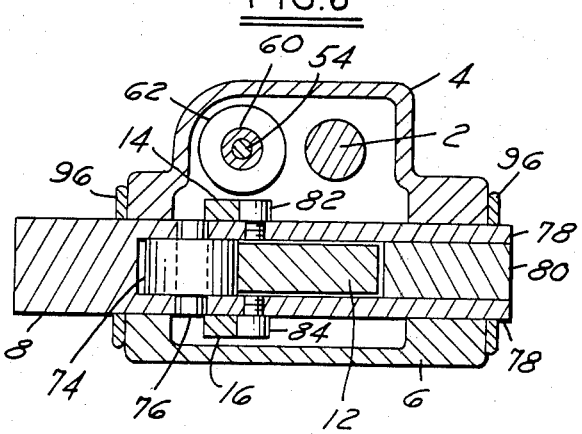
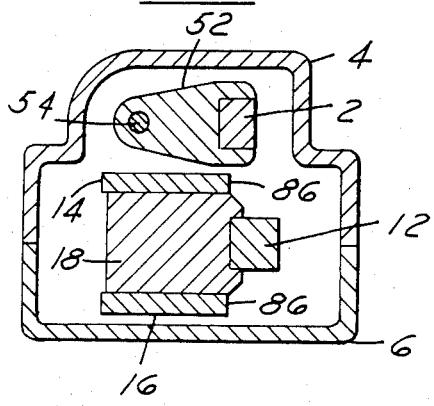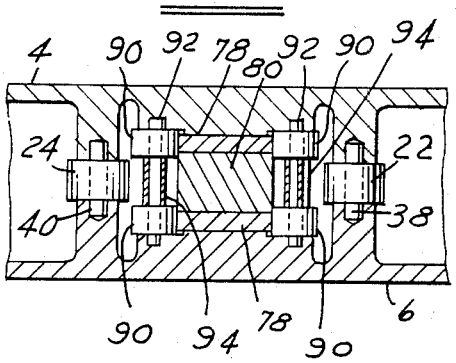

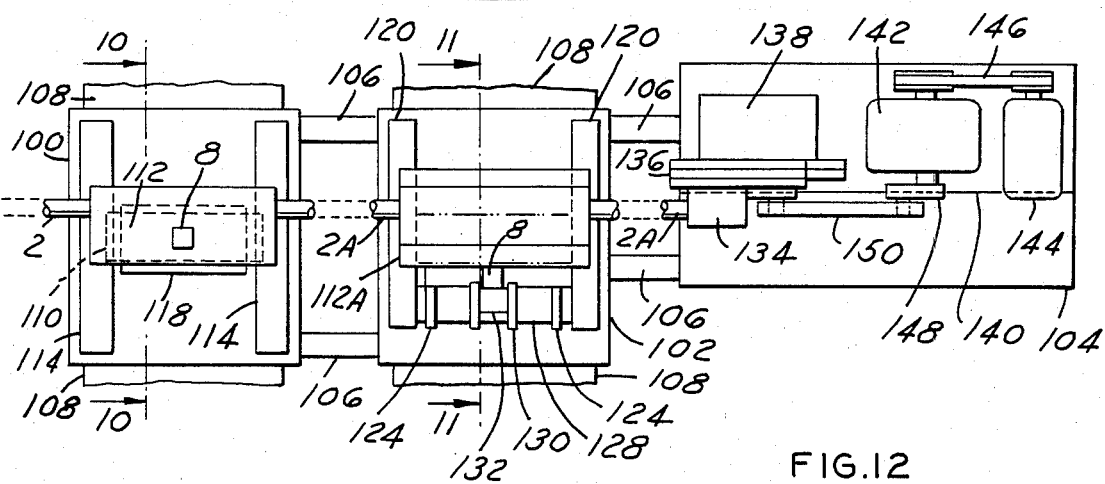
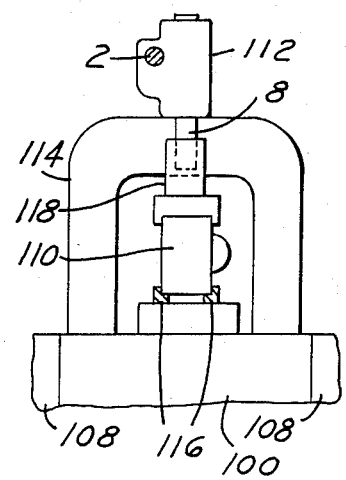
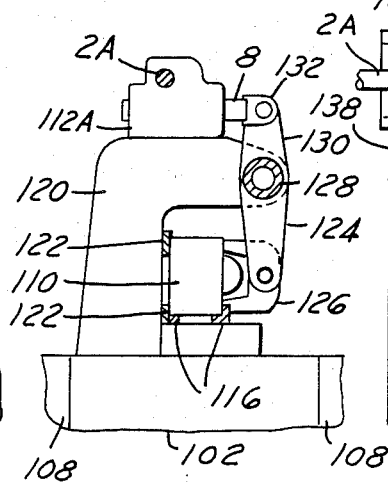
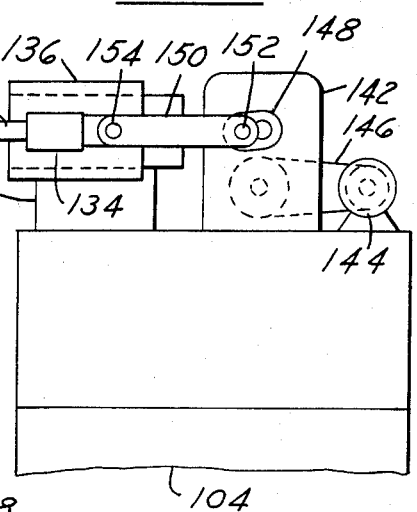
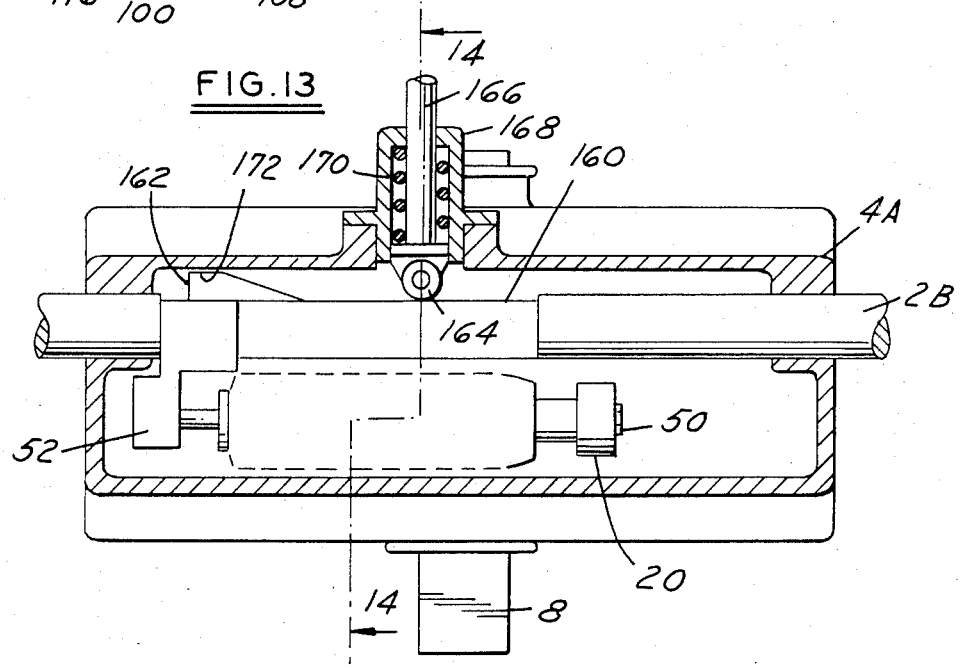

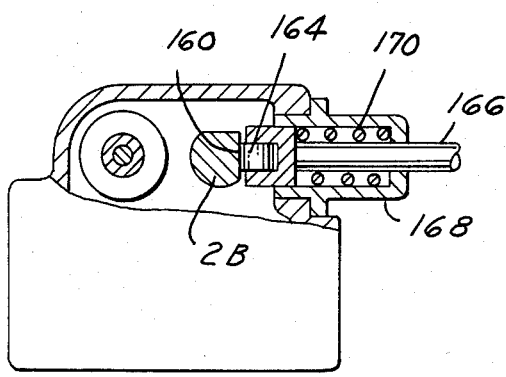
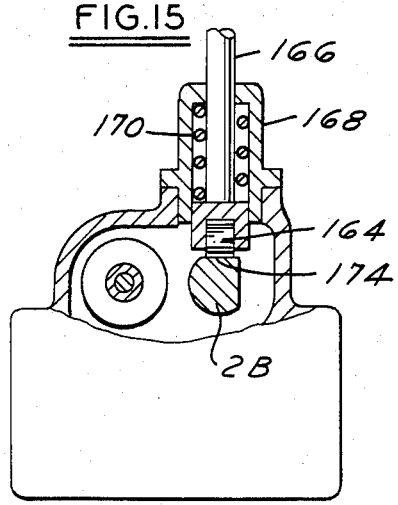

WORKPIECE CLAMPING MECHANISM FOR MULTIPLE STATION TRANSFER MACHINES

FIELD OF THE INVENTION

Multiple station transfer machines and clamping devices for workpieces.

BACKGROUND OF THE INVENTION

In the field of multiple station transfer machines, there exist two fundamentally different methods of transferring or moving a workpiece from station to station. In one method, a workpiece (or workpieces) is clamped in a pallet and the pallet is transferred from the station and is located and clamped in each station, thereby establishing the position of the workpiece with respect to each particular station. Techniques for the locating and clamping of such pallets are illustrated by my copending patent application, Ser. No. 164,092, now U.S. Pat. No. 4,362,233 issued Dec. 7, 1982, and my U.S. Pat. No. 4,201,284. Machines utilizing this technique are generally referred to as pallet machines. They are generally applied to workpieces whose configurations are such as to make it difficult to transfer and relocate the workpiece without benefit of a pallet.

However, there are some types of workpieces, for example, cylinder heads for internal combustion engines, in which it is possible to transfer the workpieces from station to station as independent workpieces, without their being clamped in a pallet. Such machines are referred to as free part transfer machines. In machines of this type, it is present normal practice to locate and clamp the workpieces in each station using separate hydraulically actuated mechanisms.

It is one object of this invention to provide a standard linear mechanical clamp module usable in free part transfer machines which can be used in a variety of clamping applications, and adapted to be driven by a single actuating means on a multiple station machine.

It is another object of this invention to provide, in the aforesaid mechanical clamp module, optional means for actuating the locating system for the workpiece in each station in the appropriate time relationship with the clamping system.

In the general case, it is necessary for the workpiece clamps to be retracted several inches from the workpiece for the workpiece to be transferred into and out of a given station. As the clamps approach the workpiece, during the initial portion of a clamp operation, little force is required to move the clamps. However, once the clamps contact the workpieces, a large clamping force is required to properly hold the workpiece during the processing operation performed in any given station. It is another object of this invention to provide a mechanism which has a relatively low mechanical advantage from input to output during the initial portion of the clamp operation, then have a relatively large mechanical advantage from the input to output during the actual clamp portion of the operation.

Since it is intended that a single actuation mechanism be utilized to operate a multiplicity of mechanical clamp modules, it is very desirable that the mechanical efficiency of each unit be very high. It is another object of this invention to provide a mechanism in which the aforesaid movement objectives are met utilizing only high efficiency mechanisms.

Other objects and features of the invention will be apparent in the following description and claims in which the principles of the invention are set forth together with details to enable persons skilled in the art to practice the invention, all in connection with the preferred embodiment of the invention presently contemplated.

BRIEF DESCRIPTION OF THE DRAWINGS

DRAWINGS accompany the disclosure and the various views thereof may be briefly described as:

FIG. 1, an external front view of the linear clamping module.

FIG. 2, an external side view of the linear clamping module.

FIG. 3, a section taken on line 3—3 of FIG. 2.
FIG. 4, a section taken on line 4—4 of FIG. 2.
FIG. 5, a section taken on line 5—5 of FIG. 3.
FIG. 6, a section taken on line 6—6 of FIG. 3.
FIG. 7, a section taken on line 7—7 of FIG. 3.
FIG. 8, a section taken on line 8—8 of FIG. 3.
FIG. 9, a schematic plan view of a multistation transfer machine showing two illustrative applications of the linear clamp module and an illustrative drive mechanism.

FIG. 10, a section taken on line 10—10 of FIG. 9.
FIG. 11, a section taken on line 11—11 of FIG. 9.
FIG. 12, a front view of the illustrative drive mechanism of FIG. 9.

FIG. 13, a variation on the section of FIG. 4.
FIG. 14, a section taken on line 14—14 of FIG. 13.
FIG. 15, a variation on the section of FIG. 14.

DETAILED DESCRIPTION OF THE INVENTION AND THE MANNER AND PROCESS OF USING IT

Referring to FIGS. 1 and 2, which are the front and side external views of the clamp module, an input rod 2 is slidably mounted in an upper housing 4, for movement along its own axis by external means to be subsequently described. A lower housing 6 is mated and suitably sealed to the upper housing 4 forming a sealed enclosure for the mechanism to be described and guiding an output bar 8 which is moved along its own axis by this mechanism. This axis is substantially perpendicular to the axis of the input rod 2 and in a different plane. The output bar 8 drives any one of a variety of clamping mechanisms for a given workpiece, as will also be subsequently described.

Referring to the sections FIGS. 3–8, a cam assembly 10 is made up of a load cam 12, two symmetrically disposed return cams 14 and 16, and two cam spacers: an idle cam spacer 18 and a driving cam spacer 20. These five elements are suitably bolted together to form the composite cam assembly 10. This cam assembly is constrained for movement along an axis parallel to the axis of the input rod 2 by a group of rollers, and by sliding contact with the housings 4 and 6 as follows: guide rollers 22 and 24 contact the outer surface of load cam 12; guide rollers 26 and 28 contact the outer surface of upper return cam 14 and guide rollers 30 and 32 contact the outer surface of the lower return cam 16. These rollers 22–32 as a group control the movement of the cam assembly 10 in the plane of the section of FIG. 3; the cam assembly 10 is restrained within this plane by sliding contact with the upper housing guide pads 34 (FIG. 5) and lower housing guide pads 36. It can be seen that guide rollers 22 and 24 for the load cam are supported by pins 38 and 40 which are trapped in blind holes in the upper and lower housings; similarly, the return cam guide rollers 28 and 32 are mounted on pin 42 and spaced through a spacer 44 (FIG. 5) and in like manner the other two return cam guide rollers 26 and 30 are mounted on pin 46 and spaced through a comparable spacer.

It can be seen, therefore, that the cam assembly 10 is comprised of three flat plate cams, the load cam 12 in the center and the two return cams 14 and 16 lying in parallel planes to the load cam but spaced therefrom. These three cams are connected together only at their ends by the cam spacers 18 and 20.

This cam assembly 10 is connected to and driven by the input rod 2 through a spring cartridge 48 (FIG. 4). At its one end the spring cartridge 48 is connected to the driving cam spacer 20 through bolt 50; at its other end, the spring cartridge 48 is connected to the input rod 2 through a bracket 52, which is keyed to the input rod through a short rectangular section of the normal circular section.

The spring cartridge 48 is comprised of a pull rod 54 threaded at its end end into the bracket 52; at its other end a keeper 56 is held transversely to the pull rod 54 in a slot 58 therein. The pull rod 54 operates in a tube 60 flanged at one end and held into the driving cam spacer 20 at its other end by the bolt 50. A series of disc springs 62, also known as belleville washers, slide on the outside of the tube 60 and are compressed between the flange on the tube and a sliding washer 64 which bears against the keeper 56; this keeper operates through a slot 66 in the tube 60 in connecting the pull rod 54 to the stack of disc springs 62. In its fully retracted position, the spring cartridge causes the bracket 52 to bear against the flange of the tube 60; in this position, the disc springs are in their most extended condition and are significantly preloaded, as part of their assembly process. When the pulling load on the spring cartridge between the bracket 52 and the driving cam spacer 20 exceeds the preload force of the disc springs, the pull rod 54 extends with respect to the tube 60 and compresses the stack of disc springs 62. When the pulling load on the spring cartridge between the bracket 52 and the driving cam spacer 20 is less than the preload force of the disc springs, the bracket 52 is held against the tube flange and the spring cartridge behaves as a solid connection between the bracket 52 and the driving cam spacer 20.

The load cam 12 includes a cam surface comprised of a fast rise portion 70 (FIG. 3), a low rise portion as shown by the dimension lines and arrow 72 in FIG. 3, and a smooth transition section therebetween. This cam surface is engaged by a cam follower roller 74 which operates on a pin 76 in the output bar 8. It will be noted, FIG. 6, that the output bar is slotted to accept the roller 74, and the two tangs 78 formed by this slotting operation, straddle the load cam 12, but lie inside the return cams 14 and 16. On the other side of the load cam 12, the two tangs 78 are joined by a spacer block 80 bolted therebetween. A cam follower roller 82 is mounted in the upper tang 78 and operates on the cam surface of the upper return cam 14; similarly, a cam follower roller 84 is mounted in the lower tang 78 and operates on the cam surface of the lower return cam 16. The cam surfaces 86 of the return cams 14, 16 are conjugated to cam surface 70, 72 of the load camp; i.e., the cam surfaces are interrelated such that for any position of the cam assembly, within its operating range, the roller 74 is in contact with the load cam surface 70, 72 while the rollers 82 and 84 are in contact with the cam surfaces of the return cams 14, 16, within reasonable manufacturing tolerances.

The output bar 8, and the tangs 78 created therein by the slots, is guided for movement along its axis by four pairs of rollers 90 (FIGS. 3 and 8). Each pair of these rollers 90 is supported by a pin 92 engaged in blind holes in the housings, and the rollers are spaced by tubular spacers 94 on the pins 92. In the other plane, the output bar 8 is guided by a sliding fit with the upper and lower housings. The mechanism housing will be partially filled with lubricant and this will be retained by wiper seals 96 on the housing which operate on the output bar 8.

The mechanism described above is shown in all views in the approximate center of its clamp portion stroke. Referring to FIGS. 3 and 4, the functioning of the mechanism may be visualized as follows. In the fully returned position, the input rod is positioned such that the bracket 52 mounted thereon is in the position shown by the dotted lines on 52A (FIG. 4). In this same fully returned position, the spring cartridge 48 is fully retracted, with the bracket 52 held against the tube flange by the preload on the spring discs, and the driving cam spacer 20 is in the position shown by the dotted lines 20A. This corresponds to a fully returned position of the cam assembly as shown by the dotted lines 10A (FIG. 3). In turn, this position of the cam assembly 10A creates a fully returned position of the output bar as is shown by position 8A (FIGS. 3 and 4).

From this fully returned position of the mechanism as described above and as designated by the suffix letter A, the extension stroke proceeds as follows. The input rod 2 is moved from right to left, FIG. 3, through a fixed stroke by an external drive mechanism, moving the bracket 52 from the fully retracted position 52A to the fully extended position 52. During the initial approximately 70% of this stroke of the input rod 2, the spring cartridge, its preload force not exceeded, moves as a solid member and drives the cam assembly 10 with it through the driving cam spacer 20. This movement of the cam assembly 10 causes the fast rise portion 70 of the load cam 12 to drive the cam follower roller 74 and the output bar 8 through approximately 97% of its stroke. With the external load to be driven by the output bar 8 in a typical clamping situation, this corresponds to the movement of the clamps from a fully returned position, to a position in contact or near contact with the workpiece. Simply stated, the first approximately 70% of the fixed full stroke of the input rod causes the output bar 8 to move through approximately 97% of its full stroke. At the end of this interval, the cam roller 74 will be positioned at the beginning of the low rise portion 72 of the load cam 12. It will be noted that, during this interval, the output bar was being extended by the high rise portion 70 of the cam 12 and only a slight mechanical advantage existed from the input rod to the output bar. This corresponds to the relatively low force requirements of the load, which is moving the clamps through space from their fully retracted position to a position just contacting or nearly contacting a workpiece.

During the approximate final 30% of the stroke of the input rod 2, at the end of which the bracket reaches its final position 52, the cam assembly 10 is still driven through the spring cartridge 48 and moves the output bar 8 through the roller 74 on the low rise portion 72 of the load cam 12. It can be seen that because of the very shallow rise of this cam surface, a mechanical advantage of approximately 15:1 exists between the output bar force to the input rod foce; i.e., the force exerted by the output bar is approximately 15 times greater than the input rod force.

At some indeterminate position during this interval, the clamps are tightly clamped against the workpiece and the output bar 8 is externally restrained from further movement. This in turn restrains the cam assembly 10 from further movement; this includes the driving cam spacer 20 which is also restrained or stalled. The input rod, however, is driven through a fixed stroke by its external drive system. This difference in the externally constrained stroke of the cam assembly 10 and the fixed stroke of the input rod is absorbed through the extension of the spring cartridge 48.

Because of the considerable preload of the spring cartridge, the force it exerts over its maximum working stroke, which is at least as long as the low rise portion 72 of the load cam 12, is reasonably flat over this length. Therefore, the clamping force exerted by the output bar at any point of external constraint within its final approximate 3% of stroke is reasonably constant.

In FIGS. 3 and 4, the output bar is shown in the position of having been externally constrained at about the midpoint of its final 3% of movement at high mechanical advantage; accordingly, the cam assembly 10 is shown with the roller 74 positioned at about the midpoint of the low rise portion 72 of the load cam 12. Since the cam assembly 10 was constrained from reaching its full stroke, which is shown by the dashed line 10B, the difference in stroke is shown by the extension of the spring cartridge 48 (FIG. 4).

During the return stroke of the mechanism from the position shown in FIGS. 3 and 4, the following events occur. The input rod is moved from left to right, by external means through a return stroke equal to its forward stroke. During the first approximately 15% of the return stroke of input rod, the spring cartridge pulls together due to the extension of the spring discs until the bracket 52 contacts the flanged tube. From this point onward, the left to right movement of the input rod drives the driving cam spacer 20 through the spring cartridge, now acting in compression as a solid member. The corresponding movement of the cam assembly 10 causes the cam surfaces 86 of the return cams 14 and 16 to retract the output bar 8 through the rollers 82 and 84. It can be seen that this return movement is comprised of two steps, an initial movement of approximately half of the 3% of the output bar stroke during the second approximately 15% of the input rod stroke, followed by a final movement of the output bar of approximately 97% of its full stroke, during the final 70% of the stroke of the input bar.

Referring again to FIG. 3, it is clear that all forces associated with the generation of the forces on the output bar are vectors that lie in the plane of the view of FIG. 3. As such, all these forces are generated by or reacted through rollers, as opposed to sliding friction. The only sliding contacts involve small forces such as between the housing and the cam assembly or between the housing and the output bar, but these sliding contacts involve only the positioning of these elements to keep them operating in the plane of FIG. 3 and do not enter into the force loops associated with the generation of the clamp forces. Since there are no sliding contacts involved in these high force areas, only rollers, it is proper to deem this a high efficiency mechanism, where efficiency is defined in the classical sense of work-out divided by work-in, and work is again the classically defined "force times distance".

In the foregoing description, the words "up" and "down", "right" and "left" were used in the context of the various views as drawn in the figures. It will be understood that this entire mechanism may be mounted in any position in a machine, dependent only on the clamping requirements of each station. Several illustrative applications of this mechanism will now be described.

Referring to FIG. 9, a composite plan view of an illustrative transfer machine, partially shown, two center bases 100 and 102 are attached to each other end to a drive support base 104, through tie spacers 106. Wing bases 108 are attached to each of the center bases 100 and 102 and support the tooling used to operate on the workpieces 110 as they move through the machine. The transfer rails, the transfer bar and its associated drive mechanism are omitted from the view of FIG. 9 for clarity. A clamp module 112, as described above and comprised of members designated by reference characters 2 to 96, is mounted on two bridging risers 114 on center base 100 (FIG. 10); this module is mounted with its output bar 8 acting along a vertical axis and its input rod 2 acting along a horizontal axis parallel to the line of workpiece transfer. The workpiece 110 in this station is supported by transfer rails 116 (FIGS. 10 and 11) and is clamped vertically downward on these rails by a clamp pad 118 mounted on the output bar 8 of the clamp module 112.

Referring to FIGS. 9 and 11, another clamp module 112A is mounted on two angular risers 120 mounted on center base 102; this module is mounted with its output bar 8 operating along a horizontal axis, while the input rod 2A still operates along the horizontal axis parallel to the line of the machine. The workpiece 110 is again supported by transfer rails 116; it is additionally located by fixed vertical locator pads 122, and clamped against them by pivoted clamp arms 124 and clamp pads 126. These clamp arms 124 are mounted on a torque tube 128, pivoted on the ends of risers 120; torque tube 128 in turn is driven by arms 130 and clevis 132 mounted on the output bar 8 of the clamp module 112A.

The input rods 2 and 2A are positioned substantially along a common axis and suitably connected together with coupling collars, screw adjustments, or other devices causingthese rods to move in unison. It will be understood that there may be additional stations along the machine, with additional clamping modules mounted thereon and having input rods suitably interconnected together.

Referring to FIGS. 9 and 12, the outboard end of input rod 2A is driven by a connector 134 bolted to a sliding carriage 136 mounted through gibs to a riser bracket 138. This riser bracket in turn is mounted on another riser 140 from the drive base 104. A gear reducer 142 is also mounted on the riser 140 and is driven by a motor 144 through belts and pulleys 146. A crank arm 148 is mounted to the output shaft of the gear reducer 142 and drives a connecting rod 150 through a pin 152. The other end of the connecting rod 150 drives the sliding carriage 136 through a pin 154. It can be seen that in the position shown in FIGS. 9 and 12, the crank arm is in the "9 o'clock position" and the connecting rod and sliding carriage are at the leftmost ends of their stroke; this corresponds to the clamped position of the clamp modules 112 and 112A. When the crank arm 148 is driven in either direction, through an angle of 180° from the position shown, by the electric motor and gear reducer, the sliding carriage 136 will be moved to its rightmost position pulling the input rods 2 and 2A (and any others connected thereto) to their unclamped position. This pulls the clamp pad 118 upward (FIG. 10) and causes the clamp pads 126 (FIG. 11) to move to the right, clearing the workpiece 110 in both stations. Similarly, the clamp action in all clamp modules is created by a rotation of the crank 148 from a three o'clock position to a 9 o'clock position.

The actuating mechanism shown in FIGS. 9 and 12 is only one of many prime movers which may be utilized to generate the fixed stroke of the input rods 2 to the clamp modules. A cylinder may be used for their direct action or a reciprocating output mechanism such as illustrated in my U. S. Pat. No. 3,789,676 may be used to advantage.

In some stations, one or more auxiliary motions, other than clamping, may be required. One example of such a requirement is a motion in which locator pins are inserted into the workpiece, to establish a more precise "in station" location of the workpiece than was created by the transfer bar movement. This locator pin movement, by its nature, must be completed prior to the actuation of the clamps, since otherwise the workpiece is clamped or partially clamped, and hence immovable while the locating process is incomplete.

Another technique for providing a more precise position in station location of the workpiece involves two discreet auxiliary movements, both of which must be completed before the clamps engage the workpiece. The first of these movements involves moving a locator pad into a position near one end face or the other of the workpiece; this movement is generally in a direction transverse to the direction of workpiece movement during transfer. The second of these auxiliary movements, after the transfer bar dogs have been retracted, involves moving a short stroke pusher dog, claw or wedge which contacts the workpiece and moves it primarily along the axis of transfer until its end face contacts the aforementioned locator pad. This technique establishes a far more precise location of the workpiece along the axis of transfer than is possible with the transfer bar alone and is routinely utilized with hydraulically located and clamped workpieces in the existing art.

These and other types of auxiliary movements, properly sequenced with the clamp actuation, can also be achieved through optional features of the clamp module.

Referring to FIG. 13, which is a variation based on the view of FIG. 4, and FIG. 14, a section on FIG. 13, the input rod 2B is modified by having a portion 160 formed into a flat section from the normal circular section. A simple rise cam 162 is bolted to the flat portion 160 of the input rod 2B. This cam 162 cooperates with a roller 164 mounted in an auxiliary output rod 166 slidably fitted in an adaptor 168 in which it can move along its own axis substantially perpendicular to the axis of the input rod 2B. A spring 170 acting between a flange on the auxiliary output rod 166 and the rear inner portion of the adaptor 168 acts to keep the roller 164 loaded against the input rod 2B.

The elements of the mechanism shown in FIG. 13 are with the input rod 2B in its full clamped position, i.e., at the end of its full stroke to the left. As the input rod 2B is moved to the right, the output bar 8 is retracted as previously described. At approximately midstroke of the input rod moving from left to right the cam 162 contacts the roller 164 and forces the auxiliary output rod 166 outward and compresses the spring 170. At the end of the unclamp, left to right, movement of the input rod 2B, the cam 162 will have moved the auxiliary output rod 166 through its full outward stroke, equal to the height of the arm 162, and the roller 164 will be contacting the flat dwell portion 172 of cam 162. Typically, the outward stroke of the auxiliary output rod 166 will retract a set of locating pins from the workpiece through a linkage adapted to the specific requirements.

Starting from this full unclamped position of the input rod 2B, the movement from right to left of this rod causes the clamp action previously described. Very early during this movement, the roller 164 moves down the ramp of cam 162 allowing the spring 170 to retract the auxiliary output rod 166. This typically will extend the locating pins, or their equivalent. Near midstroke of the right to left movement of the input rod 2B the movement of the auxiliary output rod 166 will be completed while the clamps have not yet contacted the workpiece, which interrelationship is typically required. It will be noted that the retraction of the auxiliary output rod 166, which typically extends the locating pins, is driven by the springs 170 working against the cam 162. This is desirable in that any jam in the locating process, caused by a variety of reasons, will merely cause this auxiliary output rod movement to stall under the force of the spring, without breaking any components. Furthermore, with this arrangement, the extension of the auxiliary output rod, which typically retracts the locating pins is positively generated; this is desirable in that it assures clearance for the ensuing forward motion of the workpieces by the transfer system.

FIG. 15 shows an alternate position for the auxiliary output rod. In this case, a second flat portion 174 of the input rod 2B is utilized to mount a cam identical with or similar to the cam 162. It is easily seen that motion of the auxiliary output rod is functionaly identical with that of FIG. 14, differing only in the direction of movement relative to the direction of movement of the output bar.

Furthermore, it can be seen that the sections of FIGS. 14 and 15 can be combined, thereby creating a mechanism having two auxiliary output rods. Since each such rod is driven by its own cam, it is possible to vary both the stroke and timing of each output rod independently.

I claim:

1. In a multiple station transfer machine in which workpieces are progressively transferred from station to station in said machine and in which said workpieces are individually clamped in each station by movable clamping means, a unified mechanism for clamping said workpieces in the individual stations which comprises:
    A. one or more individual self-contained linear clamp modules mountable in various positions of orientation at each station and in which each linear clamp module comprises:
       1. a housing,
       2. an input member mounted for substantially linear movement in each said housing,
       3. an output member mounted for substantially linear movement in said housing in a direction transverse to the linear movement of said input member to be operatively associated with said clamping means in said station, said output members being oriented to move in a plane normal to the linear movement of said input member but at selected angles in said plane,
4. cam means mounted for substantially linear movement in said housing,
5. elastic means connecting said input member and said cam means,
6. cam follower means mounted on said output member engaging said cam means, and B. reciprocating drive means mounted on said machine operatively connected to drive multiple said input members of said multiple linear clamp modules simultaneously in the same direction, whereby each said input member is driven through a substantially constant stroke and progressively drives said elastic means, said cam means, said cam follower means, said output member, and said clamping means, until said clamping means movement is stalled by clamping contact with said workpiece thereby arresting the movement of said cam means and causing any differential movement of said cam means and said input member to be absorbed by said elastic means, C. said output member having a transverse opening and said cam means comprising a load cam member projecting through said opening with a cam surface in contact with a load cam follower roller in said opening, and a return cam mounted on and parallel to said load member comprising parallel spaced cam plates slideable along each side of said output member and cooperating with return cam follower rollers on each side of said output member on surfaces outside said opening.

* * * * *